(12) United States Patent
Chang et al.

(10) Patent No.: US 9,681,045 B2
(45) Date of Patent: Jun. 13, 2017

(54) SYSTEMS AND METHODS FOR GENERATING A PANORAMIC IMAGE

(71) Applicant: OmniVision Technologies, Inc., Santa Clara, CA (US)

(72) Inventors: Kuochin Chang, Cupertino, CA (US); Hasan Gadjali, Fremont, CA (US); Seok Hoon Nam, Pleasanton, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 381 days.

(21) Appl. No.: 14/304,634

(22) Filed: Jun. 13, 2014

(65) Prior Publication Data

US 2014/0368609 A1 Dec. 18, 2014

Related U.S. Application Data

(60) Provisional application No. 61/835,492, filed on Jun. 14, 2013.

(51) Int. Cl.
*H04N 7/00* (2011.01)
*H04N 5/232* (2006.01)

(52) U.S. Cl.
CPC .............................. *H04N 5/23238* (2013.01)

(58) Field of Classification Search
CPC ... H04N 5/23238; H04N 5/3415; G03B 27/00
See application file for complete search history.

(56) References Cited

U.S. PATENT DOCUMENTS 6,771,304 B1 8/2004 Mancuso et al.
2002/0140829 A1 10/2002 Colavin et al.
(Continued)

FOREIGN PATENT DOCUMENTS

| TW | 201137507 A1 | 11/2011 |
|---|---|---|
| TW | 201143430 A1 | 12/2011 |
| TW | 201310160 A1 | 3/2013 |

OTHER PUBLICATIONS

Taiwanese Patent Application TW103120316 Office Action and Translation dated Jul. 6, 2015, 6 pages.

*Primary Examiner* — Sath V Perungavoor
*Assistant Examiner* — Xiaolan Xu
(74) *Attorney, Agent, or Firm* — Lathrop & Gage LLP

(57) ABSTRACT

Systems and methods for generating a panoramic image include capturing image data from a plurality of cameras and storing the image data within a memory buffer of the respective camera; transmitting image data from an upstream camera to a downstream camera; and combining, within the downstream camera, the image data from the upstream camera with the image data of the downstream camera as combined image data. Each of the plurality of cameras may include an imaging array for capturing image data of a scene; a receiver for receiving image data from an upstream camera of the plurality of cameras; a memory buffer for: combining the image data received from the upstream camera with image data captured by the imaging array to form combined image data, and storing the combined image data; and a transmitter for transmitting the stored combined image data to a downstream camera of the plurality of camera.

17 Claims, 5 Drawing Sheets

(56) References Cited

U.S. PATENT DOCUMENTS

| | | | |
|---|---|---|---|
| 2008/0049116 A1* | 2/2008 | Tojima | H04N 5/232 348/222.1 |
| 2008/0084483 A1* | 4/2008 | Kusaka | H04N 5/23212 348/222.1 |
| 2010/0020173 A1* | 1/2010 | Marquart | G08B 13/19656 348/143 |
| 2011/0119405 A1* | 5/2011 | Parr | G06F 13/37 710/4 |
| 2013/0016181 A1 | 1/2013 | Penner | |
| 2014/0028851 A1 | 1/2014 | Shan et al. | |
| 2014/0226648 A1* | 8/2014 | Xing | H04W 56/001 370/350 |

* cited by examiner

SYSTEMS AND METHODS FOR GENERATING A PANORAMIC IMAGE

RELATED APPLICATIONS

This application claims benefit of priority to U.S. Provisional Application Ser. No. 61/835,492, filed Jun. 14, 2013, which is incorporated by reference in its entirety herewith.

BACKGROUND

This disclosure relates to image sensors for generating panoramic views. In particular, a mobile industry processor interface (MIPI) daisy chain is constructed using a plurality of CMOS image sensors to create a panoramic view.

Panoramic images taken by a smartphone are typically generated using a single camera wherein the user adjusts the field of view of the camera to take a plurality of images. This operation takes substantial effort from the user, and moreover, this operation takes substantial processing requirements to fuse the plurality of fields of view together.

SUMMARY

In a first aspect, a method for generating a panoramic image is disclosed including: capturing image data from a plurality of cameras and storing the image data within a memory buffer of the respective camera; transmitting image data from an upstream camera of the plurality of cameras to a downstream camera of the plurality of cameras; and combining, within the downstream camera, the image data from the upstream camera with the image data of the downstream camera as combined image data.

In a second aspect, a system for generating a panoramic image is disclosed including: a plurality of cameras, each camera having an imaging array for capturing image data of a scene, a receiver for receiving image data from an upstream camera of the plurality of cameras, and a memory buffer for: combining the image data received from the upstream camera with image data captured by the imaging array to form combined image data, and storing the combined image data, and a transmitter for transmitting the stored combined image data to a downstream camera of the plurality of camera.

DETAILED DESCRIPTION OF THE EMBODIMENTS

Applications for the embodiments disclosed herein may include panorama or surround view imaging, 3D imaging, gesture recognition. Cameras described herein may be coupled together via a length of cable in the form of a daisy chain instead of optical fiber.

A number of cameras (or image sensors) are used to achieve a panoramic view. In certain embodiments, each of the number of cameras need not be aligned on any one axis as camera alignment is achieved through pre-calibration. Although there is overlap between multiple cameras, one-time programmable (OTP) memory may be programmed to read out so that there is no overlap in the panoramic image produced by the cameras.

In one embodiment, there is no frame memory, only line buffer memory. In another embodiment, there may be additional frame memory such that the concepts discussed below are processed for each individual frame, and then combined together.

In some embodiments a line buffer shares data with a picture-in-picture (PIP) master buffer.

A horizontal blanking time (H blanking time) may be defined by the time needed to transfer image line data collected by each sensor to a host. For example, the H blanking time may be proportional to the number of image sensors in the system. Data rate (i.e., transfer and receiving rates) may be limited by MIPI transmission (Tx) and receiving (Rx) lanes.

Figure 3:
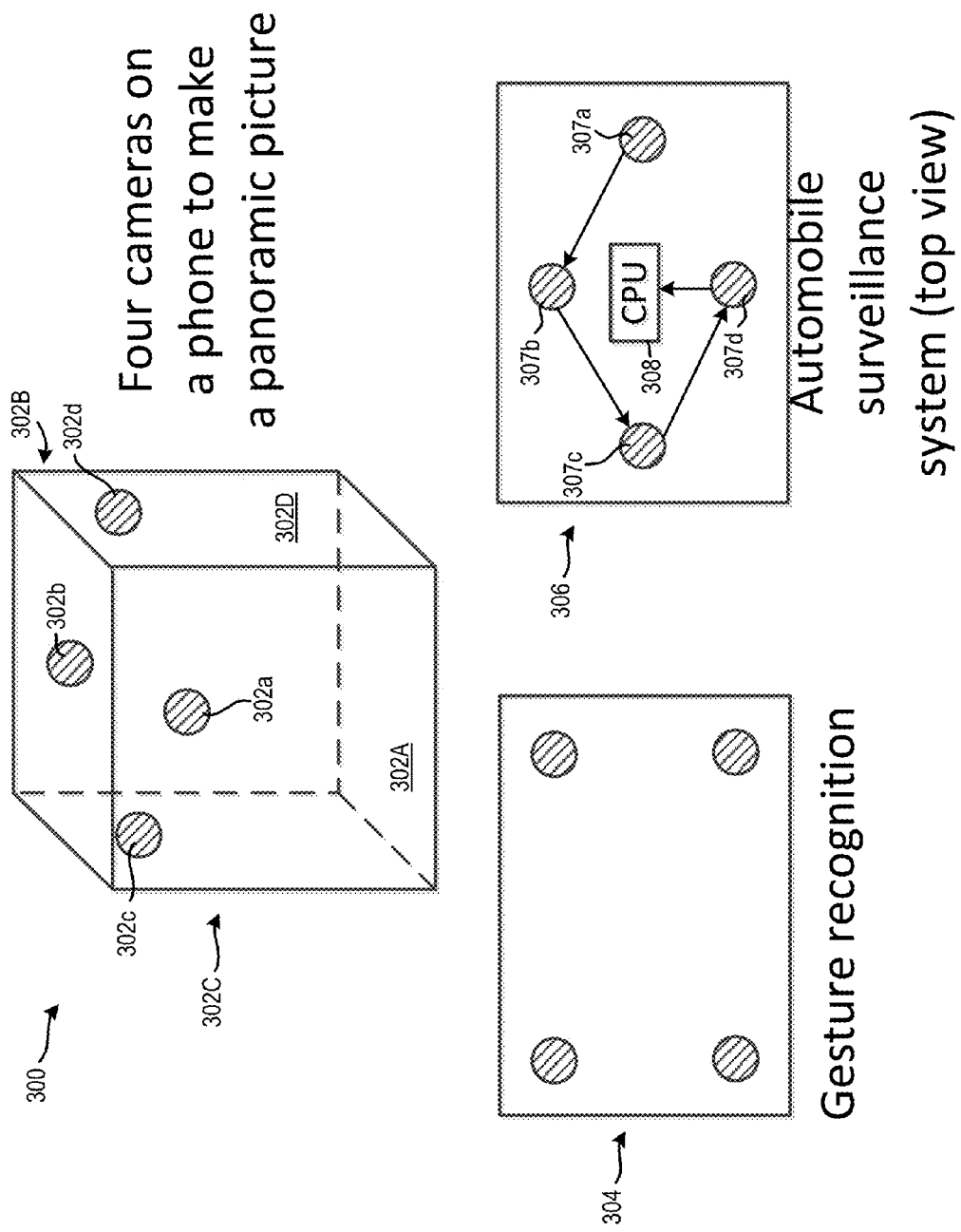
FIG. 3 depicts exemplary configurations of a plurality of cameras within a daisy chain.

In one embodiment, a global inter-integrated circuitry identifier (I²C ID) identifies a chain of cameras (or image sensors) and individual I²C IDs identify each particular camera (or image sensor). Individual I²C IDs for each camera may be loaded from OTP memory during an initial setting. Additional examples related to the I²C protocol are discussed in further detail below. In one embodiment, some "middle" sensors may only bypass data as will be described below. Exemplary camera alignments are illustrated in FIG. 3. For example, arrangement 300 depicts an embodiment including four cameras located on a phone used to make panoramic images. Arrangement 304 depicts an exemplary gesture recognition embodiment. Arrangement 306 depicts an exemplary automobile surveillance system, from a top view.

Figure 1:
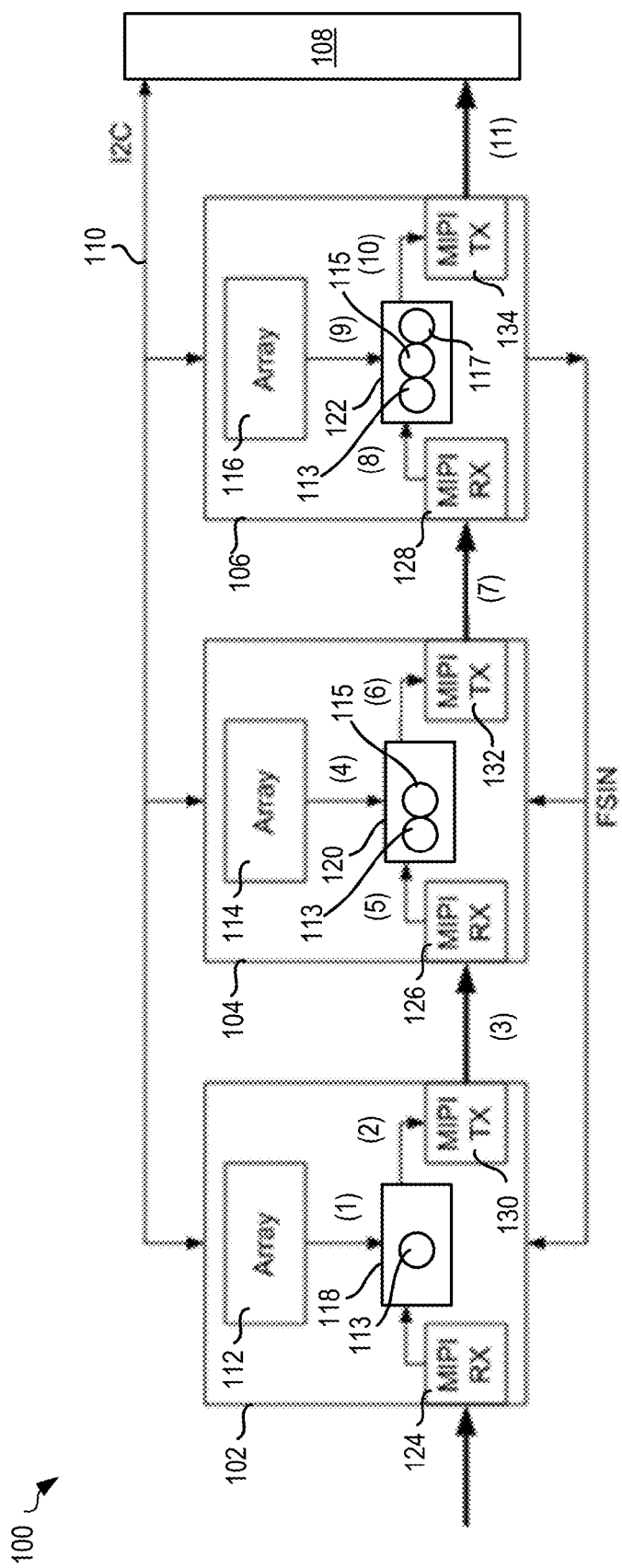
FIG. 1 depicts a block diagram of an exemplary daisy chain of a plurality of imaging arrays for producing a panoramic image, in one embodiment.

Within FIG. 1, upstream cameras are towards the left, and downstream cameras are towards the right, with camera 102 being the first camera in MIPI daisy chain 100. All cameras 102, 104, and 106 (and potentially host 108, if host 108 is a camera) simultaneously obtain image data of an image scene. For example, cameras 102, 104, and 106 may take one or more rows of image data, and store them in each respective buffer 118, 120, and 122. Arrows (1), (4) and (9), within FIG. 1 indicate image data transfer from each array to the respective buffer. Beginning with first camera 102, image data stored within buffer 118 is transferred from first camera 102 to second camera 104, where it is combined with image data stored within buffer 120. For example, MIPI Tx 130 transmits image data stored within buffer 118 to MIPI Rx 126, of camera 104, as indicated by arrow (3). Then as indicated by arrow (5), MIPI Rx 126 of middle camera 104 transmits the image data from immediate upstream first camera 102, and saves it to line buffer 120, where the image data generated by array 112 is combined in series with image data generated by array 114. Data transfer indicated by arrows (2), (3), and (5) may begin after a first row of image data is transferred to buffer 118, but prior to the entire array of image data from array 112 is collected. That is, camera 102 may transfer image data to camera 104 simultaneously as camera 102 is capturing the image data via array 112.

MIPI daisy chain 100 includes three imaging cameras 102, 104, and 106, each coupled together in series and to a host 108 using an I²C data line 110. Host 108 may be a processor, or alternatively host 108 may be the most downstream camera including a processor for controlling the timing of upstream cameras via I²C data line 110. The present application is not intended to be limited in scope to solely I²C bus protocol. That is, other connection protocols may be used to couple each of cameras 102, 104, and 106 and host 108. Moreover, daisy chain 100 may include more or fewer cameras than illustrated without departing from the scope hereof.

Each camera 102, 104, and 106 includes associated camera subcomponents, which includes, for example, imaging array (i.e. arrays 112, 114, 116 within cameras), an associated buffer (i.e. buffers 118, 120, and 122), an associated MIPI receiver (i.e. MIPI Receivers 124, 126 and 128) and an associated MIPI transmitter (i.e. MIPI Transmitters 130, 132, and 134). Imaging arrays 112, 114, 116 are for example CMOS, CCD, NMOS, Live MOS, or other arrays of photosensitive pixels capable of generating image data of a panoramic scene. Buffers 118, 120, and 122 are memory buffers that are capable of storing image data from their respective imaging array, as well as image data received from upstream cameras within daisy chain 100. For example, buffer 120, of the second camera 104 stores image data from array 114, as well as image data received through MIPI Rx 126, from MIPI Tx 130 of camera 102. MIPI receivers receive image data from an upstream camera (i.e. MIPI Rx 126, of camera 104, receives image data from MIPI Tx 130, of camera 102.) MIPI transceivers transmit image data to a downstream camera (i.e. MIPI Tx 132 transmits data to MIPI Rx 128.)

Within FIG. 1, upstream cameras are towards the left, and downstream cameras are towards the right, with camera 102 being the first camera in MIPI daisy chain 100. All cameras 102, 104, and 106 (and potentially host 108, if host is a camera) simultaneously obtain image data of an image scene. For example, cameras 102, 104, and 106 may take one or more rows of image data, and store them in each respective buffer 118, 120, and 122. Arrows (1), (4) and (9), within FIG. 1 indicate image data transfer from each array to the respective buffer. Beginning with first camera 102, image data stored within buffer 118 is transferred from first camera 102 to second camera 104, where it is combined with image data stored within buffer 120. For example, MIPI Tx 130 transmits image data stored within buffer 118 to MIPI Rx 126, of camera 104, as indicated by arrow (3). Then as indicated by arrow (5), MIPI Rx 126 of middle camera 104 transmits the image data from immediate upstream first camera 102, and saves it to line buffer 120, where the image data generated by array 112 is combined in series with image data generated by array 114. Data transfer indicated by arrows (2), (3), and (5) may begin after a first row of image data is transferred to buffer 118, but prior to the entire array of image data from array 112 is collected. That is, camera 102 may transfer image data to camera 104 simultaneously as camera 102 is capturing the image data via array 112.

Once combined within buffer 120, the combined image data is transferred to MIPI Tx 132, as indicated by arrow (6), which in turn transmits the image data to the MIPI Rx of the next immediate downstream camera (i.e. MIPI RX 128 of camera 106). Although described above as simultaneously capturing image data, it should be appreciated that each camera is not required to capture image data at the same time. In such embodiment, camera 104 may image the scene after, or just prior to, receiving image data from MIPI Tx 130, of camera 102. Thus, the order of data transfer indicated by arrows (4) and (5) is interchangeable.

Data transfer indicated by lines (3) through (6) repeat for each additional downstream camera (i.e., camera 106) in MIPI daisy chain 100. For example, in data transfer (7), MIPI Tx 132 of middle camera 104 transmits the combined rows of data to the MIPI Rx 128 of downstream right camera 106. The same process continues, as denoted by lines (8)-(10), in the rightmost camera 106. The last camera in the daisy chain 100 transmits (11) the total combined rows of data to host 108.

The time it takes for a particular row of image data to transfer from the most upstream camera (i.e. camera 102) to the host 108 defines the H-blanking time of the overall daisy chain 100. The H-blanking time is significantly less than the processing time required to transfer all image data from each camera, and fuse the image data together by a processor. For example, certain cameras capture image data by "scanning" a first row of pixels, and then scanning a second row of pixels, and so on until all rows are scanned. Advantageously, in the daisy chain 100 configuration, the first row of image data from the most upstream camera may begin being transferred to the next downstream camera prior to the completion of the scanning of the entire imaging array of the first camera. Therefore, the processing time to generate the panoramic image is significantly reduced. Additionally, because the OTP defines fusion characteristics between each adjacent camera in the daisy chain, the processing time is reduced because complex image fusion techniques that require large processing times are not required.

In one embodiment, features of the architecture within each camera of FIG. 1 may be summarized as follows. First, each camera reads out the same timing line row and saves it to its own line buffer. Second, a MIPI Tx receives MIPI line data from line buffer and ships it to the next camera in line, and simultaneously each camera begins read out of the next timing line row. Third a MIPI Rx receives MIPI line data from the upstream camera and ships it to the line buffer, and the last camera MIPI line data is shipped to the host.

Figure 2:
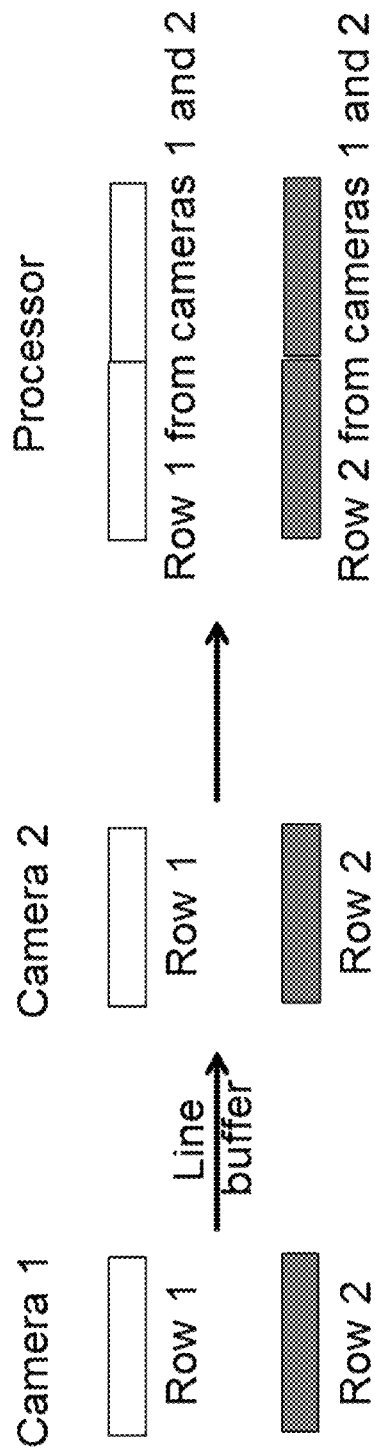
FIG. 2 depicts a block diagram illustrating exemplary processing of multiple rows of data received by a plurality of cameras, for example the daisy chain of FIG. 1, in one embodiment.

In the above description, an image consists of multiple rows. An example of how each row of image data is produced, combined and transmitted is described. FIG. 2 depicts a block diagram illustrating exemplary processing of multiple rows of data received by a plurality of cameras, for example the daisy chain 100, of FIG. 1, in one embodiment. Cameras 1, 2, and 3 (not shown) are analogous to cameras 112, 114, 116 of FIG. 1 and each produce a respective row 1 of data, wherein each of the row 1 data are transmitted through a line buffer, combined, and finally sent to a processor (or host camera) to form a final row 1 as shown. The same process applies to rows 2, 3, etc.

Accordingly, each current camera in the daisy chain receives combined image data from each upstream camera, adds the row of image data from the current camera to the combined image data, and then sends the updated combined image data downstream to the next camera in the chain. This is illustrated in FIG. 1 via circles representing data from each camera. For example, data 113, of camera 102 is initially stored within buffer 118, and then passes through each downstream buffer 120 and 122, where data 113 is combined with the additional data from each downstream camera. Similarly, data 115 is initially stored within buffer 120, combined with data 113 in buffer 120, and the combination data 113 and 115 then passes through buffer 122 where it is combined with data 117. This process repeats until all combined data reaches host 108. As disclosed above, camera alignment is achieved through pre-calibration of the OTP. Although there is overlap between multiple cameras, OTP memory may be programmed to read out properly so that there is no overlap in the panoramic view.

FIG. 3 depicts exemplary configurations of a plurality of cameras within a daisy chain. Each of the cameras may be located on respective sides of an object. For example, configuration 300 illustrates a smart phone configuration having four cameras 302a-302d (indicated by the dashed lines circles), where each camera is located on a respective side 302A-302D of the smartphone. As illustrated, camera 302a is located on front side 302A, camera 302b is illustrated on rear side 302B, camera 302(c) is located on left side 302C), and camera 302d is located on right side 302D. The cameras are configured as a daisy chain, thereby a panoramic image produced by the smartphone incorporates the concepts and structure discussed above with respect to FIGS. 1-2.

Configuration 304 illustrates a gesture recognition configuration wherein each camera is located on a single surface of a device, such as a smartphone. Importantly, utilizing the daisy chain configuration provides significant advantages to gesture recognition. As discussed above, the processing time is significantly reduced with the daisy chain—therefore rapid gestures can be more accurately be recognized.

Configuration 306 illustrates an automobile surveillance system in a top view. Each camera is located on a different side of the automobile. It should be appreciated that more or fewer cameras may be on each side of the automobile. The reduced processing time of the daisy chain configuration of the cameras within configuration 306 is advantageous because automobiles travel at high speeds. Therefore, faster processing time allows for more frequent and accurate imaging of the surrounding environment that the automobile is travelling in. Within configuration 306, each camera 307a-307d may be configured as a daisy chain, as discussed above. Moreover, CPU 308 may operate in similar manner to host 108, discussed above. CPU 308 may be a main vehicle computer, or a separate CPU for providing visual recognition assistance such as a visual lane assist computer, automatic headlamp control, windshield wiper assistance control, parking assistance control, braking assistance control, or other vehicle operation assistance utilizing visual image data. CPU may receive and analyze image data received from each of cameras 307a-307d and utilize such information to assist in operation of the vehicle.

Figure 4:
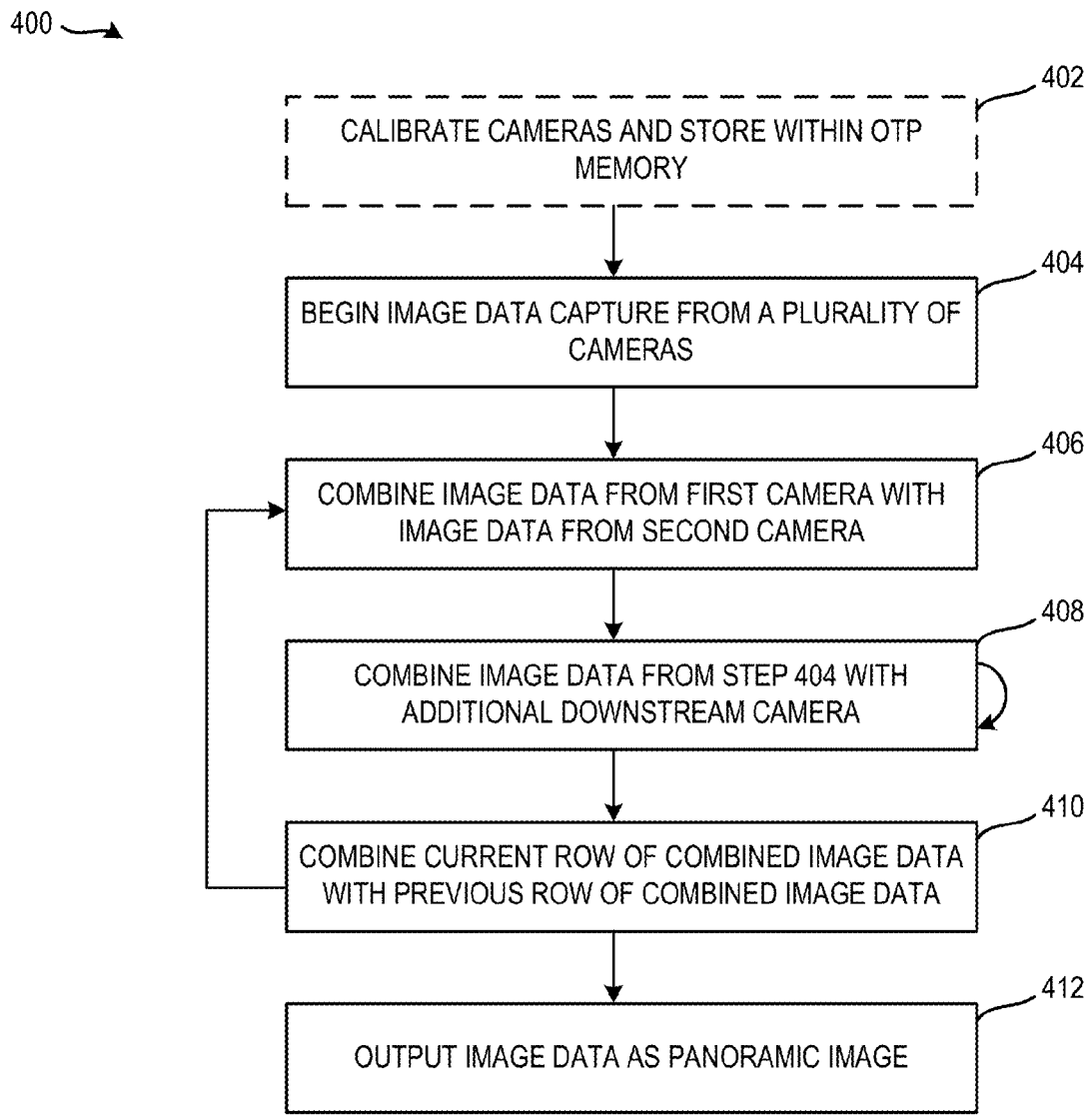
FIG. 4 depicts an exemplary method for generating an image utilizing a daisy chain of cameras, in one embodiment.

FIG. 4 depicts an exemplary method 400 for generating an image utilizing a daisy chain of cameras, in one embodiment. Method 400 is for example performed using daisy chain 100, of FIG. 1.

In optional step 402, method 400 calibrates each camera and store calibration setting in OTP memory to coordinate image fusion between a plurality of cameras. For example, step 402 is performed by a processor, or host 108, and calibrates each of cameras 102, 104, 106 such that overlap blurring does not exist in an image produced by the combination of image data from each of the cameras.

In step 404, a plurality of cameras capture image data. In one example of step 404, each camera 102, 104, 106 begins capture of image data 113, 115, 117 of an external scene and stores the image data within its respective line buffer 118, 120, 122. For example, to capture image data, a timing signal is sent from host 108 via I²C bus line 110 such that a row of pixels of each array 112, 114, 116 is simultaneously read out and stored within the respective buffer.

In step 406, image data of a first camera, stored within the buffer of the first camera in step 404, is combined with the image data of the second camera. For example, image data of the first camera is transferred from the first camera to a second camera downstream from the first camera, and the image data from the first camera is combined at the second camera with the image data of the second camera. In one example of step 406, a first row of image data stored within buffer 118 is transferred to MIPI Tx 130. The image data is transferred via MIPI Tx 130 to MIPI Rx 126 of camera 104. The image data 113 is then stored and combined with the first row of image data 115 captured by second camera 104 in buffer 120. Step 406 may be implemented after the first row of image data 113 is captured by camera 102, but prior to capturing image data of the entire array 112.

In step 408, the combined image data of the first and second camera, stored within the buffer of the second camera in step 406 is combined with the image data of an additional camera. For example, combined image data of a first row of image data (including a first row of image data from array 112 combined with a first row of image data from array 114) is transferred and combined with the first row of image data 117 from array 116, of the third camera. In one example of operation of step 408, combined image data 113+115 from second camera 104 is transferred, via MIPI Tx 132, to MIPI Rx 128 of third camera 106. Combined image 113+115 data is then combined with the first row of image data 117 of the additional camera (i.e. camera 106) within the buffer of the additional camera (i.e. buffer 122). Step 408 repeats for each additional downstream camera until the combined image data is transferred to host 108.

Steps 406-408 repeat for each row of image data captured by the cameras of the daisy chain. In step 410, method 400 combines the current row of combined image data with the previous row of combined image data. In one example of operation, host 108 receives a combined second row of image data from camera 106 (i.e. via MIPI Tx 134), and combines the second row of image data with the first row of image data.

In step 412, method 400 outputs a panoramic image including all combined rows of combined image data from each camera. For example, host 108 outputs a panoramic image including combined rows of combined image data received by each of cameras 102, 104, and 106.

The above embodiments include using I²C protocol to control timing of image capture sequencing. I²C allows communication of data between two I²C devices over two wires, thereby reducing the physical footprint required for the image system daisy chain. For example, each device is connected to a clock and a data serial line used to control timing and data information, respectively. Within the I²C protocol, each device is a master device or a slave device. The master device is in charge of the bus at the present time, controls the clock, generates start and stop signals, and can send data or receive data to and from the slave devices. The slave devices listen to the bus and act on controls and data it receives. Typically slaves do not transfer data among themselves.

Figure 5:
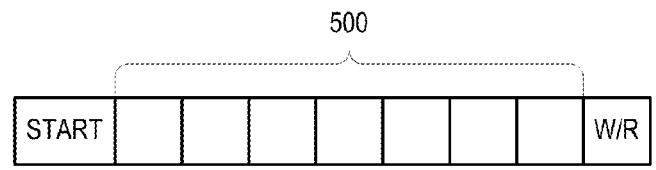
FIG. 5 depicts an exemplary address identifier for each device within the daisy chain of FIG. 1.

FIG. 5 depicts an exemplary address identifier 500 for each device within daisy chain 100, of FIG. 1. For example each of the arrays, MIPI Tx, MIPI Rx may have an identifier associated therewith. Moreover, each identifier is unique to the particular device. Accordingly, when a master sends a signal to one or more slave devices, the signal is broadcast to all slaves at the same time. Each device compares the first 7 bits after the START bit with its own address to determine if the master is "talking" to that particular slave device. If the first 7 bits match its own address identifier, the slave device considers itself addressed by the master. The bit following the address identifier is a read/write bit. It should be appreciated that the address identifier may include a fixed part and a programmable part. Moreover, the address identifier may have more or fewer bits associated therewith than illustrated in FIG. 5 without departing from the scope hereof.

Figure 6:
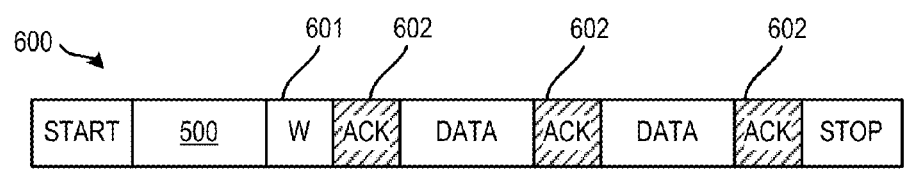
FIG. 6 depicts an exemplary data transfer diagram showing a master device writing to a slave device, in one embodiment.

FIG. 6 depicts an exemplary data transfer diagram 600 showing a master writing to a slave, in one embodiment. Within FIG. 6, data sent from the master to the slave has no fill, and data sent from the slave to the master has dashed fill. In the data transfer 600, the transfer starts, includes an identifier 500, and a write bit 601. The master then waits for an acknowledgement 602 from the slave. After receiving the acknowledgment 602, the master begins data transfer. The slave may acknowledge data transfer periodically throughout the transfer process until the master sends a stop command.

Figure 7:
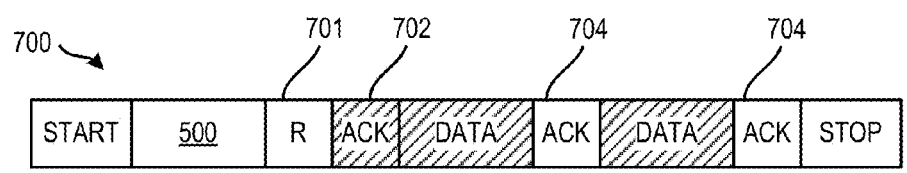
FIG. 7 depicts an exemplary data transfer diagram showing a master device reading from a slave device, in one embodiment.

FIG. 7 depicts an exemplary data transfer diagram 700 showing a master reading from a slave, in one embodiment. Within FIG. 7, data sent from the master to the slave has no fill, and data sent from the slave to the master has dashed fill. In data transfer 700, the transfer starts, includes an identifier 500, and a read bit 701. The master then waits for an acknowledgement 702 from the slave. After sending acknowledgment 702, the slave begins data transfer to the master. The master periodically sends acknowledgment 704 indicating receipt of data from slave until the master sends a stop command.

Figure 8:
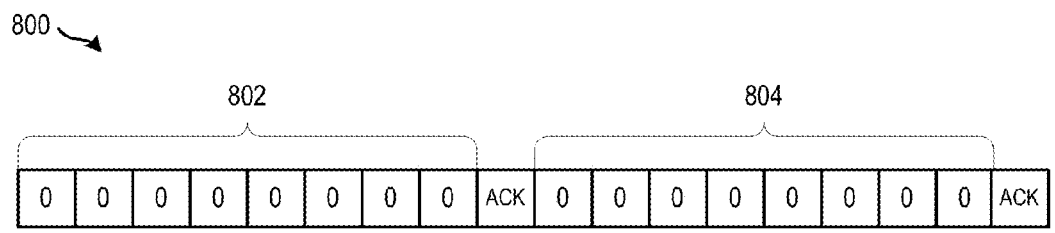
FIG. 8 depicts a general call over the I²C bus line of FIG. 1 in one embodiment.

FIG. 8 depicts a general call 800 over the I²C bus line, in one embodiment. General call 800 includes a first byte 802 indicating which slave devices the call is addressing, and a second byte 804 indicating the action to be taken. For example, first byte 802 may indicate that all arrays are being addressed, and second byte 804 may indicate to begin capturing image data. In one example of operation, host 108 of FIG. 1 transmits general call 800 via I²C bus line 110 to each of cameras 102, 104, 106. As discussed above, the master may address more than one slave at a time.

In certain embodiments, the second byte may indicate which devices are to utilize the programmable part of their identifier (i.e. identifier 500). In such embodiments, the last bit of the second byte may be 0 or 1. When 0, all slaves may either reset and take in the programmable part of their address, or take in the programmable part of their address without reset. When the last bit of the second byte is 1, the call is made by the master device that does not have any prior information of the connected slave addresses. Here, the master does the call with its own address such that the slaves can identify the source of the message.

Using I²C protocol within a imaging system daisy chain provides significant advantages. For example, the I²C protocol assists in camera initialization and syncing, thereby significantly reducing blur between fused portions of a produced panoramic image. For example, within the daisy chain 100, of FIG. 1, the image data collected by each array 112, 114, 116 may be synchronized based upon a general call as discussed above with respect to FIG. 8.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for generating a panoramic image, the method comprising:
   capturing image data from at least three cameras, the image data for each of the cameras being a series of rows captured by respective rows of an imaging array of the camera, the cameras being coupled in series such that all cameras except a first camera of the series of cameras is a downstream camera coupled to an immediate upstream camera;
   for each of the cameras, storing, one row at a time, the image data within a memory buffer of the respective camera;
   transmitting, one row at a time, the image data from each immediate upstream camera to the downstream camera coupled thereto; and
   combining, within each downstream camera, each row of the image data from the immediate upstream camera with a corresponding row of the image data from the downstream camera to form a row of combined image data.

2. The method of claim 1, the step of capturing comprising simultaneously capturing image data from the cameras.

3. The method of claim 1, wherein the step of transmitting occurs after a first row of the series of rows is captured by the immediate upstream camera, but prior to a last row of the series of rows is captured by the immediate upstream camera.

4. The method of claim 1,
   the step of transmitting comprising utilizing a transmitter within the immediate upstream camera to access the image data from the memory buffer of the immediate upstream camera, and transmitting the accessed image data to a receiver of the downstream camera; and,
   the step of combining comprising storing the image data, from the immediate upstream camera, from the receiver of the downstream camera into the memory buffer of the downstream camera.

5. The method of claim 1, further comprising generating a call signal from a host to control data transfer between the cameras.

6. The method of claim 5, further comprising transmitting the call signal over an inter-integrated circuit (I²C) bus.

7. The method of claim 5, the call signal comprising a first byte indicating an address identifier identifying one or more of the camera, and camera subcomponents, and a second byte indicating an action to be taken by the addressed one or more of the camera, memory buffer within each camera, transmitter within each camera.

8. A system for generating a panoramic image, the system comprising at least three serially coupled cameras, each camera comprising:
   an imaging array for capturing image data of a scene, the image data being in the form of a series of rows;
   a receiver for receiving, one row at a time, a series of rows of image data captured by an immediate upstream camera of the serially coupled cameras;
   a memory buffer for:
      combining one of the rows of image data received from the immediate upstream camera with one of the rows of image data captured by the imaging array to form a row of combined image data, and
      storing the row of combined image data; and a transmitter for (a) when the camera is not a first one of the serially coupled cameras, transmitting the row of combined image data to a downstream camera of the serially coupled cameras, prior to the memory buffer completing the step of storing for a next row of combined image data, and (b) when the camera is the first one of the serially coupled cameras, transmitting a row of image data captured by the imaging array of the camera.

9. The system of claim 8, further comprising a host for coordinating data transfer between the serially coupled cameras.

10. The system of claim 8, wherein each of the serially coupled cameras is adapted to simultaneously capture the image data.

11. The system of claim 8, wherein each of the serially coupled cameras is coupled together via an inter-integrated circuit ($I^2C$) bus.

12. The system of claim 9, wherein the host includes a master one of the serially coupled cameras, and the remaining serially coupled cameras are slaves.

13. The system of claim 9, wherein the host includes an external processor.

14. The system of claim 8, the immediate upstream camera being configured to begin transmitting the image data to the downstream camera after a first row of the series of rows is captured by the immediate upstream camera, but prior to capturing a last row of the series of rows by the immediate upstream camera.

15. The system of claim 8, wherein the serially coupled cameras are located on respective sides of an object.

16. The system of claim 8, further comprising:
a respective address identifier for each of the imaging array, memory buffer, receiver, and transmitter of each of the serially coupled cameras; and
an inter-integrated circuit ($I^2C$) bus coupling the host to each of the cameras;
wherein the host coordinates data transfer between each of the cameras via a call signal transmitted over the $I^2C$ bus indicating which address identifier is being addressed by the host.

17. The system of claim 16, the call signal comprising a first byte indicating which address identifier is being addressed and a second byte indicating the action to be taken by at least one camera subcomponent.

* * * * *